United States Patent [19]

Gil et al.

[11] Patent Number: 4,994,442
[45] Date of Patent: Feb. 19, 1991

[54] METHOD FOR STIMULATION OR REPAIR AND REGENERATION OF INTESTINAL GUT CELLS IN INFANTS AND ENHANCING THE IMMUNE RESPONSE OF T-CELLS

[75] Inventors: Angel H. Gil; Daniel V. Morales; Eduardo R. Valverde, all of Granada, Spain

[73] Assignee: Union Industrial Y Agro-Ganadera, S.A. (UNIASA), Granada, Spain

[21] Appl. No.: 273,596

[22] Filed: Nov. 21, 1988

Related U.S. Application Data

[62] Division of Ser. No. 55,858, Jun. 1, 1987, abandoned.

[30] Foreign Application Priority Data

May 29, 1987 [ES] Spain ................................ 8701601

[51] Int. Cl.$^5$ .......................... A61K 31/70; A23C 9/00
[52] U.S. Cl. ........................................... 514/45; 514/46; 514/47; 514/48; 514/49; 514/50; 514/51; 514/885; 426/72; 426/73; 426/74
[58] Field of Search .................. 514/23, 2, 885, 46, 514/47, 48, 49, 50, 51; 426/72, 73, 74

[56] References Cited

U.S. PATENT DOCUMENTS

| 3,231,385 | 1/1966 | Ziro | 426/71 |
| 4,221,820 | 9/1980 | Jentsch | 426/410 |
| 4,337,278 | 6/1982 | Brog | 426/583 |
| 4,544,559 | 10/1985 | Gil et al. | 426/72 |
| 4,670,268 | 6/1987 | Mahmoud | 426/72 |
| 4,692,340 | 9/1987 | Grutte et al. | 426/72 |

OTHER PUBLICATIONS

Transplantation, vol. 36, No. 3, Sep. 1983, pp. 350–352.
Transplantation, vol. 40, No. 6, Dec. 1985, pp. 694–697.
Kulkarni et al., J. Parenteral and Enteral Nutr., No. 10, 1986, pp. 169–171.
Rudolph et al., Dept. Biochemistry Rice University, undated, pp. 175–178.
Kulkarni et al., Arch. Sug. No. 121, 1986, pp. 169–172.
MacKinnon et al., Biochemica et Biophysica Acta, No. 319, 1973, pp. 1–4.
Leleiko et al., J. Ped. Gastroenterol and Nutr. No. 2, 1983, pp. 313–319.
Leleiko et al., Gastroenterology No. 93, 1987, pp. 1014–1020.
Ogoshi et al., JPEN, No. 9, 1985, pp. 339–342.

Primary Examiner—Douglas W. Robinson
Assistant Examiner—Raymond J. Henley, III
Attorney, Agent, or Firm—Cushman, Darby & Cushman

[57] ABSTRACT

Nucleosides and/or nucleotides are added to infant formula, both milk and non-milk based, to provide a formula having enhanced physiological properties and also closely resemble human milk. Additionally, nutritionally balanced diet formulations are described having nucleosides and/or nucleotides incorporated therein.

16 Claims, 4 Drawing Sheets

METHOD FOR STIMULATION OR REPAIR AND REGENERATION OF INTESTINAL GUT CELLS IN INFANTS AND ENHANCING THE IMMUNE RESPONSE OF T-CELLS

This is a division of application Ser. No. 055,858, filed Jun. 1, 1987, and now abandoned.

BACKGROUND OF THE INVENTION AND PRIOR ART

The present invention relates to the composition of, and processes for making, products for infant formulas and for nutritional products suitable for both infants and adults, and particularly for clinical nutrition. These products may be administered orally or by enteral feeding tubes. These products are enriched with specific nucleosides, nucleotides, or mixtures thereof.

Infant formulas are derived, to a large extent, from cow's milk. After being diluted, the cow's milk is enriched with whey proteins, diverse carbohydrates, such as lactose, dextrinmaltose and starches, different mixtures of vegetal and animal fats, vitamins and minerals. These components are present in suitable amounts to meet the requirements of low birth weight newborns or those of at term healthy infants during the first and second semester of life.

Sometimes, infant formulas contain isolated milk proteins, isolated vegetable proteins or protein hydrolyzates, from different origins such as casein, lactalbumin, soy and meat. Also, these infant formulas have one or more carbohydrates (sucrose, dextrinmaltose and starch), mixtures of diverse kind of fats, minerals and vitamins, to meet not only the healthy newborns' nutritional requirements, but also of infants and children with clinical symptoms of lactose intolerance, protein intolerance and, in general, with diverse malabsorption-malnutrition syndromes.

The European Society of Pediatric Gastroenterology and Nutrition (ESPGAN), the American Academy of Pediatric (AAP), the Codex Alimentarius Mundi, and the European Community Council, among other organizations, have given general rules for the composition of infant formulas (ESPGAN Committee on Nutrition, Acta Paed Scand, Supl 262. 1977: ESPGAN Committee on Nutrition, Acta Paed Scand, Supl 287, 1981: ESPGAN Committee on Nutrition. Acta Paed Scand, Supl 302, 1982; ESPGAN Committee on Nutrition. Acta Paed Scand. Supl 330, 1987; AAP Committee on Nutrition, Pediatric Nutrition Handbook, 1979; AAP Committee on Nutrition, Pediatrics, 75, 976, 1985: EEC Council. 85/C 28/05 COM (84) 703 final, 1985; EEC Council, 86/C 124/06 COM/86 91 final, 1986 Codex Alimentarius Mundi, Codex Stan 72-1981).

As used herein, the term "infant formulas" is intended to refer to the well established understanding as defined by ESPGAN Committee on Nutrition, Acta Paed Scand, supl 262, pg 3, supra. and also the American Academy of Pediatrics (Pediatrics, Vol 57 no 2, pg 281, February 1976).

In general, infant formulas tend to have a composition qualitatively and quantitatively as similar as possible to human milk. Nevertheless, despite the efforts made by several researchers, infant formulas still have a number of differences in their composition compared to human milk. This is because the latter has many substances, such as immunoglobulins, free amino acids, polyamines, nucleotides, polyunsaturated fatty acids, etc, which are not present in cow's milk. Thus, it would be desirable that infant milk formulas have most of the substances present in human milk so as to produce the same physiological effects as human milk.

Nutritional products, such as those currently used in hospitals, special or for dietary purposes, are based on the utilization of diverse protein sources (casein, sodium and calcium caseinate, isolated soy protein, protein hydrolyzates and/or crystalline amino acids) mixtures of vegetable and animal fats, carbohydrates (basically glucose polymers), vitamins and minerals to meet, at least, the dietary intakes recommended for healthy individuals (Committee on Dietary Allowances, Food and Nutrition Board, Nat Acad Sci, 9th Ed. 1980).

Protein energy malnutrition (PEM) is found in many patients admitted to hospitals. This happens not only in developing countries, but also in those with a high socioeconomic level where the percentages of medical-surgical patients vary between 40-50 % (Bistrian et al. JAMA, 235, 1567,1976; G. Hill et al. Lancet, 1, 689, 1977; Gassull et al. Human Nutr: Clin Nutr, 38C, 419, 1984). Proper nutritional support for such patients, while not a primary mode of treatment is, nevertheless, an important factor for therapy and recovery. It is, therefore important to administer a nutritionally balanced diet given orally, enterally or parenterally, adequate to the needs of the patient. This is especially true for those patients where conventional feeding is contraindicated (gastroenterological patients) or is insufficient (hypercatabolic patients). The enteral or oral mode of administration of foods is preferable to parenteral modes (E. Cabre and M. A. Gassull, J. Clin Gastroenterol Nutr. 1, 97, 1986) because of the lower morbidity, trophic effect upon the intestinal mucose, lower necessity for instruments and lower costs.

Nutritional products for proper diets associated with parenteral administration should be formulated to meet the requirements of the individual needs in specific situations. Thus, complete balanced diets with an energy content between 130-150 Kcal/g nitrogen, are recomended for the preventive and repletive therapy in cases of PEM due to nervous anorexy, esophageal stenosis, maxillofacial surgery, chronic vasculo-cerebral disease, long evolution neurological syndromes, vascular surgery postoperative period, malabsorption syndromes, preoperative period, complete intestinal oclusion, preparation of colon (surgery, radiology and endoscopy) and, in general, in all cases when it is necessary to take a balanced diet of nutrients. Diets with a high content of nitrogen (80-120 Kcal/g nitrogen) are recommended for the nutritional therapy of burn patients or patients suffering cranial trauma, multiple trauma, open fractures, Crohn disease, ulcerous colitis, digestive fistula, sepsis, oncology surgery. oncological radiotherapy and chemotherapy, pre-and postoperative periods, orthopedic surgery, and, in general, for catabolic patients.

Diets containing protein hydrolyzates as a source of amino nitrogen are specially made for the nutritional support of patients with diverse malabsorption-malnutrition syndromes, such as short bowel, acute celiac disease, Crohn disease, chronic pancreatic insufficiency, cystic fibrosis, intestinal fistulas, postoperative nutrition, and the like.

Futhermore, such products can be made as specific clinical diets for specific diseases, such as hepatopathies, chronic renal disease, and chronic obstructive pulmonary disease.

In addition, there is a variety of dietary products marketed to meet the nutritional needs of various individuals. For example, many individuals desirous of achieving variyng degrees of weight loss, may benefit from the use of a special nutrition diet formulations to provide specific nutrients otherwise provided by a normal diet. Likewise, many people find it necessary to supplement their daily diet with additional nutrients due to age, allergy or physical afflictions.

As used herein, the term "nutritionally balanced diet formulations" is intended to refer to the above type of products.

Currently marketed nutrition products do not contain nucleic acids or their simpler compounds, either nucleosides and/or nucleotides, which are normally present in foods and carry out fundamental physiological functions, described further on.

In relation to the nutritional importance of nucleotides, some relevant aspects of these compounds such as their content in human milk, physiological effects in newborns, intestinal absorption, tissue utilization and effects upon cell immunity are shown below.

U.S. Pat. No. 4,544,559 teaches that human milk has a specific nucleotide content, very different from cow's milk. Human milk contains, at least, twelve different nucleotides, predominating cytidine monophosphate (CMP), adenosine monophosphate (AMP), uridine monophosphate (UMP), guanosine monophosphate (GMP), inosine monophosphate (IMP) and uridine derivatives, whereas cow's milk has very low amounts of CMP and AMP; it lacks the other nucleotides and has high amounts of orotic acid, which is absent in human milk.

Also, U.S. Pat. No. 4,544,559 teaches that a humanized milk enriched with nucleotides AMP, CMP, GMP, UMP and IMP in the same range as human milk, stimulates the development of Bifidobacterium bifidum Ti at the intestinal level. This bacterium comprises 80% of the total bifidobacteria present in the feces of breast-fed newborns. Furthermore, this humanized milk promotes serum fatty acid profile very similar to that found in newborns fed with human milk.

Ziro et al. U.S. Pat. No. 3,231,385 describes infant milk formulas supplemented with certain nucleotides to simulate human milk, improve the milk taste and lower the curd tension.

Nucleotides can be synthesized in most tissues by two processes: (a) de novo synthesis from the precursors which include pirophosphoribosilphosphate, glutamine, aspartate, glycine, formiate and carbon dioxide and (b) utilization of bases and the nucleosides liberated through the catabolism of nucleotides and nucleic acids contained in foods by the "salvage pathway" (S. Leleiko et al. J Pediatr Gastroenterol Nutr, 2, 313, 1983). This last way is an important alternative in the synthesis of nucleotides when the biosynthetic de novo pathway is hindered by an insufficient supply of precursors. Tissues such as bone marrow, intestine and the liver are heavily dependent on the salvage pathway. The activity of the "salvage pathway" has also been shown demonstrated in kidney, brain L and retina (P. Mandel, Traité de biochemie genérale, Polonovski, Boulanger, Lemoigne. Wurmser, eds, Masson et Cie, Paris. 1972).

The intestinal mucose needs a continous supply of nucleotides or their precursors from dietary origin, apart from the hepatic supply by the vascular system, in order to maintain continuous synthesis of RNA.

It has been confirmed in cuts made in the small intestine of rats that the exogenous adenosine triphosphate (ATP) increases the intracellular concentration of this nucleotide and it has been observed that at temperatures over 20° C. the marked exogenous ATP is absorbed by everted sacs of rat small intestine (J. Bronk and H. Leese. J. Physiol., 235, 183, 1973; J. Blair, M. Lucas and A. Matty, J. Physiol., 245. 333. 1975). Also, it has been shown in rabbit's ileum "in vitro" that, at low concentrations, the ATP as well as the nucleoside adenosine are absorbed through a carrier associated to the enterocyte membrane.

Since the carrier system works for ATP and adenosine, it is likely that the system also works for other purine nucleotides, because competitive inhibition measures have proved that any compound with a purine ring united to a ribose molecule is absorbed. (V. Harms and C. Stirling. Am. J. Physiol.. 233, E-47, 1977).

It has also been shown that the purines and pyrimidines in the RNA and DNA. present in the diet, are absorbed by mice, preferably as nucleosides. Between 2-5% of the nucleosides are used for nucleic acid synthesis in intestinal tissue, and citosine nucleosides are used for DNA synthesis, specially in the spleen (F. Sonoda, M. Tatibana, Biochem. Biophys. Acta, 521, 55, 1978).

It has also been shown that purine bases, such as adenine, guanine, hypoxanthine and xanthine are almost completely absorbed by rats. 4.5-6.5% being incorporated in tissues and in a greater proportion by the liver and intestine.

The absence of pyrimidine or purine derivatives in the diet is known to supress the normal function of T lymphocytes (F. Rudolph et al. Adv. Exp. Med. Biol, 165, 175. 1984), and to increase the mortality in experimental animals by staphylocoocus sepsis. The addition of pyrimidine and purine derivatives to the diet decreases the suceptibility of animals to infection (A. Kulkarni et al. JPEN, 10, 169, 1986). Thus, the effect of purines and pyrimidines on the immune function can be of great importance in a number of clinic situations, such as transplants of organs in patients, malnutrition recovery, in diverse chemotherapeutic regimens and in the treatment of leukemias derived from T cells. Accordingly, one of the objects of the present invention is to provide improved nutritionally balanced diet formulations.

Another object of the present invention is to provide non-milk infant formulas which more closely resemble the human milk of nursing mothers and also exhibit enhanced properties.

Still yet a further object of the present invention is to provide improved milk based infant formulas which not only closely resemble human milk, but which are more readily absorbed by the infant gut and enhance the infant's immune response.

These and other objects of the present invention will become more apparent from the discussion which follows.

DETAILED DESCRIPTION OF THE INVENTION

The present invention provides a range of compositions of infant formulas and clinical nutrition products enriched with nucleosides, nucleotides or mixes of these two classes of compounds and the processes for their preparation. The products are in a liquid ready to eat form, or concentrated liquid or powder.

According to the invention, adenosine, guanosine, cytidine, inosine, and uridine or their mixes are used as nucleosides, and adenosine phosphate, guanosine phosphate, cytidine phosphate, inosine phosphate and uridine phosphate are used as nucleotides.

The term uridine phosphate, guanosine phosphate, etc, is intended herein to refer collectively to the mono, di and/or tri phosphates as well as the sugar derivatives of the nucleotides mentioned. However, for various reasons which will be apparent to those knowledgeable in the art, the 5'-monophosphates are preferred.

The supplementation of nucleosides and/or nucleotides or their mixes to infant formulas and nutrition balanced diet formulations gives a better physiological fatty acid tissue membrane composition to newborns and adult patients, an improved cell immunity and a better intestinal repair in those patients with intestinal diseases.

Accordingly, one embodiment of the present invention provides for a nutritionally balanced diet formulation which comprises a source of amino nitrogen, carbohydrates, edible fats, minerals, vitamins and a nucleoside/nucleotide composition containing at least one of:

(a) uridine, uridine phosphate or a mixture thereof;
(b) guanosine, guanosine phosphate or a mixture thereof:
(c) adenosine, adenosine phosphate or a mixture thereof;
(d) cytidine, cytidine phosphate or a mixture thereof; or
(e) inosine, inosine phosphate or a mixture thereof.

Thus, the formulation must contain at least one of the fifteen different possible components in an amount (based on 100 grams of dry product) equal to 1 mg.

Generally, the diet formulation will contain (on a dry weight basis per 100 g) from 1 to 300 mg of components selected from (a), (b), (c), (d) and (e), with a preferred range being from about 50 to about 250 mg. The optimum amount appears to be about 150 mg per 100 grams product.

On a liquid basis, these ranges correspond to from about 0.2 to 60 mg/dl on a general basis, and preferably about 10 to about 50 mg/dl, with the optimum being about 30 mg/dl.

A further embodiment of our invention provides for improved non-milk infant formulas. Such non-milk formulas are well known and generally comprise carbohydrates, a source of amino acids, vegetable oils, minerals and vitamins. According to this embodiment of the invention, there is added to such formulas at least one of uridine, uridine phosphate or mixtures thereof guanosine, guanosine phosphate or mixtures thereof; adenosine, adenosine phosphate or mixtures thereof; cytidine, cytidine phosphate or mixtures thereof: or inosine, inosine phosphate or mixtures thereof. As a minimum, at least about 0.27 mg per 100 g of product of one of the components should be added to the infant formula. Generally, the non-milk infant formulas according to the present invention require on a dry weight basis in mg per 100 grams of total weight approximaterly the following additives:

| | |
|---|---|
| uridine and/or uridine phosphate | 17.40–1.86 mg; |
| guanosine and/or guanosine phosphate | 3.32–0.27 mg; |
| adenosine and/or adenosine phosphate | 9.50–4.25 mg; |
| cytidine and/or cytidine phosphate | 10–16–3.52 mg; and |
| inosine and/or inosine phosphate | 1.92–0.00 mg. |

On a liquid basis, per dl, these formulation correspond as follows:

| | |
|---|---|
| uridine and/or uridine phosphate | 2.62–0.28 mg; |
| guanosine and/or guanosine phosphate | 0.50–0.04 mg; |
| adenosine and/or adenosine phosphate | 1.43–0.64 mg; |
| cytidine and/or cytidine phosphate | 1.53–0.53 mg; and |
| inosine and/or inosine phosphate | 0.29–0.00 mg. |

For reasons discussed more fully below, it may be desirable to add small amounts of L-cistine and/or carnitine to the non-milk based infant formulas.

As yet a further embodiment of our invention there is provided an improved infant milk formula to which is added at least one nucleoside selected from the group consisting of uridine, guanosine, adenosine, cytidine and inosine. The added nucleosides must be present in an amount about 0.27 mg per 100 grams total product on a dry basis. To provide for a closer simulation of human breast milk and also enhance absorption by the infant gut, there should be added to the infant milk formula the following ingredients for each 100 g of total weight:

| | |
|---|---|
| uridine and/or uridine phosphate | 17.40–1.86 mg; |
| guanosine and/or guanosine phosphate | 3.32–0.27 mg; |
| adenosine and/or adenosine phosphate | 3.75–0.00 mg; |
| cytidine and/or cytidine phosphate | 4.58–0.00 mg; and |
| inosine and/or inosine phosphate | 1.92–0.00 mg. |

This of course corresponds on a liquid basis (per dl) as follows:

| | |
|---|---|
| uridine and/or uridine phosphate | 2.62–0.28 mg; |
| guanosine and/or guanosine phosphate | 0.50–0.04 mg; |
| adenosine and/or adenosine phosphate | 0.56–0.00 mg; |
| cytidine and/or cytidine phosphate | 0.69–0.00 mg; and |
| inosine and/or inosine phosphate | 0.29–0.00 mg. |

Basically, infant formulas, according to the present invention have a composition adequate for meeting the requirements of low birth weight infants, at term infants, children with lactose intolerance, children with cow's protein intolerance and/or malabsorption syndrome.

The infants formulas and nutritionally balanced diet products of the present invention have been found to stimulate repair and regeneration of intestinal gut cells, enhance the immune response of T-cells and provide for specific fatty acid phospholipids profiles in red blood cell membranes.

The use of nucleosides herein is unique to the formulations of the present invention. These materials generally have been found to be at least as effective as their corresponding nucleotides, and even more effective in providing for enhanced absorption through use of the salvage pathway in the human body. This apparently may be due to the higher water solubility of nucleosides as compared to the corresponding nucleotides. Also, nucleoside stability when used in the formulations of this invention is greater than that of the corresponding nucleotides.

When the nucleosides and/or nucleotides or their combinations are added to infant formulas in concentrations in the same range as human milk, according to this invention, they stimulate the conversion of essential fatty acids to their polyunsaturaded derivatives (AGPI), which is reflected in the fatty acid composition of erythrocyte membrane both in the at-term newborn and in the preterm newborn as well as in the fatty acids composition of plasma phospholipids.

In a study carried out by the inventors. 20 at-term newborns were fed exclusively on human milk. 19 with an infant formula and 19 with the same infant formula supplemented with nucleoside-5'-monophosphates according to this invention, in similar concentrations to those of human milk. The relative content of AGPI, of the w6 series, derived from linoleic acid, as well as w3 series, derived from linolenic acid, was significantly decreased, specially in phosphatidylethanolamine and phosphatidylserine of the erythrocyte membrane in infants fed milk formula with respect to infants fed nucleoside-5'-monophosphates supplemented milk formula or human milk. The same happened in the plasma phospholipids and cholesteryl esters. The arachidonic (20:4w6) and docosahexaenoic (22 6w3) acids were the most increased fatty acids in infants fed nucleoside-5'-monophosphates supplemented milk formula, with respect to those fed milk formula.

In other study, 19 preterm infants were fed exclusively on human milk, 18 with an infant milk formula for prematures and 18 with the same milk formula supplemented with nucleosides-5'-monophosphates in concentrations similar to those of human milk, according to this invention. At one month of life, the relative contents of eicosatrienoic acid (20:3w6). arachidonic acid (20:4w6), docosatetraenolc acid (22 4w6) and docosapentaenoic acid (22:5w6) were significantly decreased in the erythrocyte membrane phospholipids in infants fed milk formula with respect to those fed nucleoside-5'-monophosphate supplemented milk formula or human milk. Also, infants fed nucleoside-5'-monophosphate suplemented milk formula showed an intermediate value of docosahexaenoic acid (22:6w3) between those fed human milk and those fed milk formula. The same results were observed in the plasma phospholipids of preterm newborns.

The modulating effect of nucleosides and nucleotides of the diet upon cell immunity has been proved through the following method:

Six groups of BALB/C mice, constituted by 10 mice each, aged four weeks, weaning period, were feed with a conventional diet (Chow diet), a nucleosides and nucleotides free diet, a diet supplemented with nucleosides according to this invention, in the following proportions: 50 mg of uridine, 50 mg of guanosine, 50 mg of adenosine, 50 mg of citidine and 50 mg of inosine, a diet supplemented with nucleosides in proportions equivalent to mouse milk, a diet supplemented with 50 mg of the following nucleotides UMP, GMP, CMP, UMP according to this invention and a diet supplemented with nucleotides in proportions equivalent to mouse milk, respectively. The mice were feed during a period of four weeks, and with them we proceed with the testing of the cell immune response "in vitro" as responce to allogeneic and syngenetic antigens using the lymphocyte mixed culture technique and quantifying the cell proliferation by the incorporation of $^3$H-thymidine to DNA and secondly we proceed with the testing of the proliferation as response to phytohemaglutinin (mitogen agent) to quantify the state of lymphocyte reactivity, also with the incorporation of $^3$H-thymidine.

The mice fed on the free nucleoside or nucleotide diets had an immune response mediated by T cells lower than the other groups having a diet supplemented with these compounds.

The effect of nucleosides and nucleotides of the diet on the intestinal cell proliferation and on their enzymatic activity is proved as follows:

Two groups of Wistar mice, of 20 animals each, from the weaning (21 days of age), are fed during two weeks, the first of them on a diet (Diet A) containing 167 g of calcium caseinate. 489.5 of corn starch, 150 g of sugar, 50 g of cellulose, 100 g of soy oil, 3 g of DL-methionin, 1.1 g of coline chloride, 38.2 g of a mineral mixture and 1.2 g of a vitamin mixture, per Kg, to satisfy the nutritional requirements of these animals. The second group was fed with a similar diet, but with lactose instead of starch (Diet B). In this second group takes place an osmotic diarrhoea because of lactose intolerance giving rise to a malnutrition-malabsorption syndrome. Both groups are divided in two subgroups of 10 animals each, the first subgroup being fed on Diet A and the second with on Diet A supplemented with 50 mg of each of the following nucleosides: uridine, guanosine, adenosine, citidine and inosine, during 4 weeks or with 50 mg of each of the following nucleotides UMP, GMP, AMP, CMP and IMP, according to this invention.

The animals suffering malabsorption syndrome refed on the nucleoside or nucleotide supplemented diet, according to the invention, had ileal, jejunal and duodenal mucose weights significantly superior to those fed on a diet without such compounds. Also, the proportion of cells in a mitosis state, the mucose proteins content and the maltase and sucrase enzymatic activities were significantly higher in animals fed on the nucleoside or nucleotide supplemented diet than in those fed on a free purine and pyrimidine diet.

Basic ingredients for infant formulas include cow's milk, protein, whey proteins, casein and its salts (i.e. calcium caseinate); soy protein isolates are substituted for milk derived proteins, and are used in the products made for infants with lactose intolerance and/or cow's protein intolerance. Protein hydrolyzates (i.e. casein and lactalbumin hydrolyzates) with low molecular weight, may also be used for the products.

The proportions of the diverse component nutrients are similar to those of human milk. Thus, the ratio of whey proteins to casein currently varies from 60:40 to 70:30 in infant formulas based on milk. The mixture of fats employed is made up of edible fats to provide an essential fatty acid profile. Lactose is used exclusively as the carbohydrate source for at-term newborns infants, except that dextrinmaltose is employed in products used for the treatment of lactose intolerance and malabsorption syndromes in infancy.

Infant formulas according to the invention contain minerals (including calcium, phosphorus, sodium, potassium, chloride, magnesium, iron, zinc, copper, manganese and iodine) and vitamins (including vitamin A, vitamin $D_3$, vitamin C, vitamin $B_1$, vitamin $B_2$, vitamin $B_6$, vitamin $B_{12}$, pantothenic acid, vitamin E, vitamin K, folic acid, biotin) adequate for the infants, requirements. Also, in the products whose source of proteins is derived from soy or protein isolates or hydrolyzates, carnitine is included to satisfy the nutritional requirements for this compound in infants with malabsorptive syndromes.

The inventors of the present compositions and processes have demonstrated that the amounts of citosine, adenine, guanine, uracile and inosine derivatives in human milk vary between 1.53–0.54, 1.43–0.69, 0.50, 2.62 and 0.29–0.00 mg/dl respectively and the individual contents of CMP, AMP, GMP, UMP and IMP oscillate between 1.37–0.53, 1.19–0.64, 0.21–0.04, 0.56–0.28, 0.29–0.00 mg/dl, respectively.

The content of nucleosides and/or nucleotides in the infant formulas of the present invention are in the range of those for human milk. An examplary nucleoside and/or nucleotide mixture for infant formulas not containing cow's milk, according to the invention, is shown in Table I.

The amounts of adenosine and/or adenosine phosphate and cytidine and/or cytidine phosphate, inosine and/or inosine phosphate added to cow's milk based infant formulas, according to this invention, are lower the specific requirements of normal healthy individuals as well as those suffering malabsorption-malnutrition processes and in a hypercatabolic state.

The nutritional products are enriched with nucleosides and/or nucleotides in similar amounts of nucleotides to those present in foods.

An example of a nucleoside and/or nucleotide mixture for the enrichment of nutritional products is shown in Table III. On a dry weight basis, the amount of nucleosides and/or nucleotides may each vary from about 1 to about 300 mg per 100 grams of product, and preferably each ranges from about 50 to about 250 mg per 100 grams of product. On a liquid basis the amount may vary per deciliter of product from about 0.2 to about 60 mg of each nucleoside and/or nucleotide, and preferably ranges from about 10 to about 50 mg.

TABLE I

Example of a characteristic mixture of nucleosides and/or nucleotides in infant formulas, not containing cow's milk.

| | Powdered product | | Liquid product | |
|---|---|---|---|---|
| | Preferred mg/100 g | Range mg/100 g | Preferred mg/dl | Range mg/dl |
| Uridine and/or uridine phosphate | 3.42 | 17.40–1.86 | 0.51 | 2.62–0.28 |
| Guanosine and/or guanosine phosphate | 1.49 | 3.32–0.27 | 0.22 | 0.50–0.04 |
| Adenosine and/or adenosine phosphate | 6.90 | 9.50–4.25 | 1.03 | 1.43–0.64 |
| Cytidine and/or cytidine phosphate | 6.87 | 10.16–3.52 | 1.03 | 1.53–0.53 |
| Inosine and/or inosine phosphate | 1.00 | 1.92–0.00 | 0.15 | 0.29–0.00 | than those shown in Table I, because cow's milk contains specific amounts of nucleosides and nucleotides.

In Table II an examplary mixture of nucleosides and/or nucleotides for infant milk formulas containing cow's milk is shown.

The dietary products for balanced nutrition, according to the present invention, have a composition of nutrients adequate to the specific requirements of not only healthy human in need of a balanced nutritional product, but also those individuals in situations of energy-protein malnutrition and in hypercatabolic states derived from traumatic, septic, surgical processes and malabsorption syndromes.

TABLE II

Example of a characteristic mixture of nucleosides and/or nucleotides in infant formulas based on cow's milk.

| | Powdered product Range mg/100 g | Liquid product Range mg/dl |
|---|---|---|
| Uridine and/or uridine phosphate | 17.40–1.86 | 2.62–0.28 |
| Guanosine and/or guanosine phosphate | 3.32–0.27 | 0.50–0.04 |
| Adenosine and/or adenosine phosphate | 3.75–0.00 | 0.56–0.00 |
| Cytidine and/or cytidine phosphate | 4.58–0.00 | 0.69–0.00 |
| Inosine and/or inosine phosphate | 1.92–0.00 | 0.29–0.00 |

TABLE III

Example of a characteristic mixture of nucleosides and/or nucleotides in nutritionally balanced diets.

| | Powdered product | | Liquid product | |
|---|---|---|---|---|
| | Preferred mg/100 g | Range mg/100 g | Preferred mg/dl | Range mg/dl |
| Uridine and/or uridine phosphate | 150 | 1–300 | 30 | 0.2–60 |
| Guanosine and/or guanosine phosphate | 150 | 1–300 | 30 | 0.2–60 |
| Adenosine and/or adenosine phosphate | 150 | 1–300 | 30 | 0.2–60 |
| Cytidine and/or cytidine phosphate | 150 | 1–300 | 30 | 0.2–60 |
| Inosine and/or inosine phosphate | 150 | 1–300 | 30 | 0.2–60 |

As nitrogenous sources, the following components are preferably employed: a mixture of dairy proteins (casein or sodium and calcium caseinates and lactose free lactalbumin) and protein hydrolyzates with low molecular weight (maximum molecular weight 1,000 daltons, average molecular weight, 500 daltons). As carbohydrate sources, glucose polymers are employed, such as dextrinmaltose with a different grade of dextrose equivalent degree, preferably between 10 and 30 DE. Fats are employed as a mixture of animal and one or more vegetable fats to meet the essential fatty acids requirements of patients.

Nutritional products according to the present invention provide mineral elements which include trace elements and vitamins in adequate proportions to satisfy The invention also includes the process to obtain infant formulas, as well as specific diets to be used in good nutrition, enriched with nucleosides and/or nucleotides (FIG. 1 to 4). The products can be prepared in liquid, ready to be used, concentrated to be diluted in water before its use, and in powder forms.

This process comprises, in all cases, the preparation of a mixture containing water and non fat solids, except vitamins, minerals and nucleosides and/or nucleotides, followed by a preheating to 75°–80° C., deareation of the mixture, injection of the fat mixture, double homogenization at 70°–75° C. (usually 150 Kg/cm² in the first stage and 50 Kg/cm² in the second) cooling to 4°–6° C. and storage in standardization tanks. The liquid products ready for consumption or concentrates to be diluted before use, are standardized in the said tanks, adapting the pH to values generally ranging from about 6.8 to about 7.1 and most preferably ranging from about 6.8 to 7.0 for infant formulas and from about 6.9 to 7.1 for nutritional products.

When the products are going to be UHT sterilized and aseptically packed in containers made of carton-aluminium-polyethylene, during the standardization, the vitamins, minerals and nucleotides or nucleosides mixtures are added as concentrated aqueous solutions and the content of mineral elements is adjusted by adding the required salts. The nucleoside and/or nucleotide solutions should be maintained preferably at pH 6–6.5 to avoid them to hydrolyze.

Once standardized, the products for consumption in liquid or concentrated forms, are sterilized through an UHT system at 145°–150° C. for 2–4 seconds and can be either aseptically packed or bottled in glass or polyethylene bottles. In the latter case, products are standardized prior to the UHT sterilization, only in their solids contents, and the pH is adjusted to values equivalents as noted above; immediately after they are sterilized, refrigerated at 4°–6° C. and stored in standardization tanks, the vitamins, minerals and the nucleoside and/or nucleotide solutions are added: afterwards the products are reheated at 30°–70° C., packed in polyethylene or glass bottles, and sterilized in a continuous sterilizer at 120°–121° C. for 10 minutes.

In the case of powder products, after the phase of concentrated solids recombination, preheating, deareation, fat mixture injection, homogenization, refrigeration, final pH standardization, concentration and addition of vitamins, minerals nucleosides and/or nucleotides, the mixture is reheated to 65°–70° C., homogenized at 100–150 Kg/cm² and dried in a spray drier. Afterwards, the powdered product is packed in polyethylene-aluminium containers or in cans, internally coated with varnish, under inert atmosphere, or in other acceptable containers.

BRIEF DESCRIPTION OF THE DRAWINGS

With reference to FIG. 1, there is depicted a process for the preparation and aseptic packaging of a liquid infant formula or a liquid nutritionally balanced diet formulation comprising a composition as set forth above, said process comprising the steps of:

(a) mixing water and non-fat solids of said composition in the absence of any vitamins, nucleosides and nucleotides;
(b) preheating the mixture to a temperature ranging from about 75° to about 80° C. and then deareating the heated mixture followed by adding any fats in the composition to the deareated mixture;
(c) homogenizing the mixture under pressure followed by cooling;
(d) standardizing the mixture by addition of any vitamins, minerals, nucleosides, nucleotides and other components not added in step (a), and adjusting the pH in the range of about 6.8 to about 7.1;
(e) UHT sterilizing the standardized mixture and subsequently homogenizing the mixture under pressure;
(f) cooling the homogenized mixture and aseptically packaging same.

Figure 1:
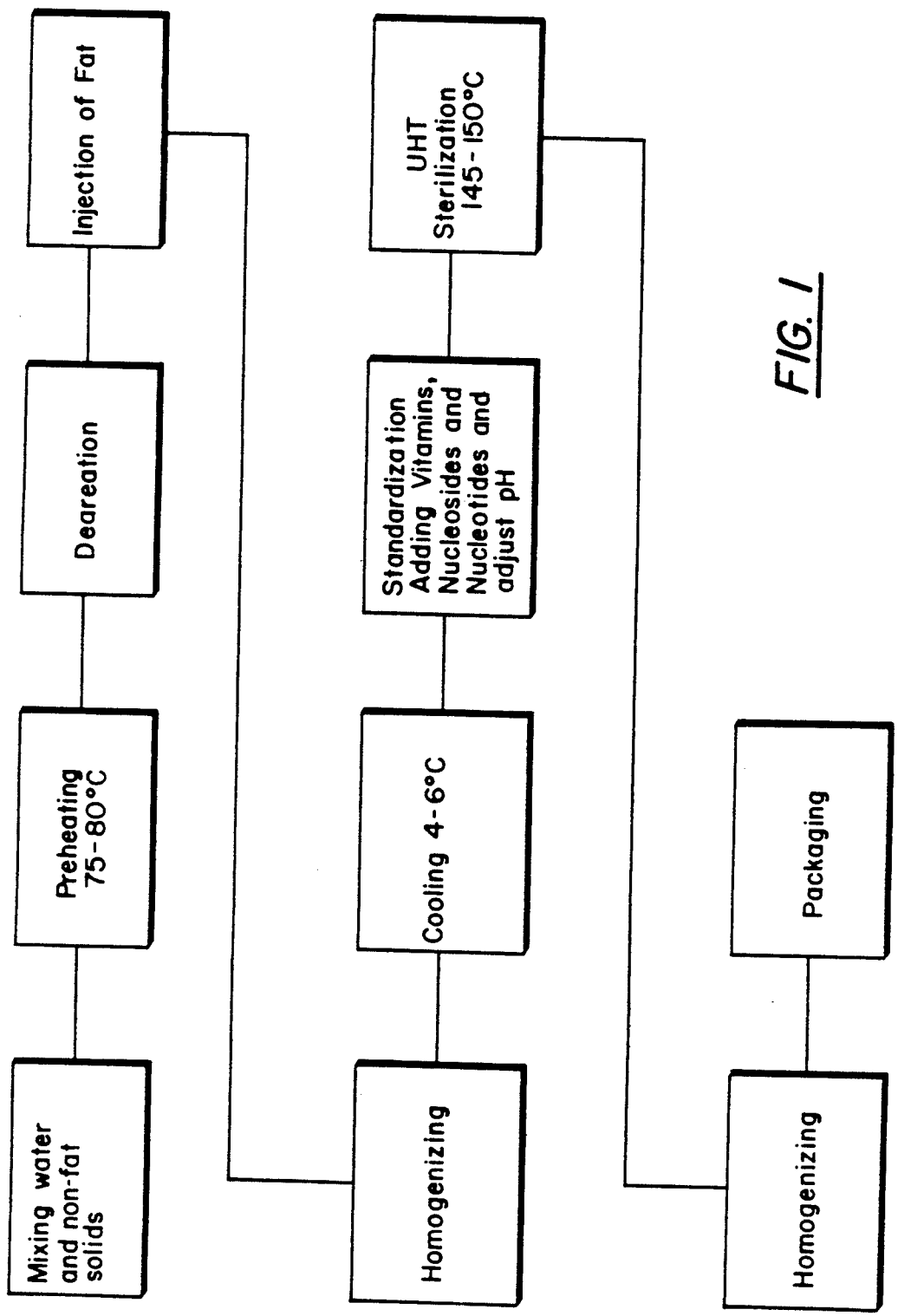
FIGS. 1 to 3 are block diagrams illustrating the stages of the process for the preparation of the products of the invention when packaged aseptically, in bottles or in powder form.
Figure 2:
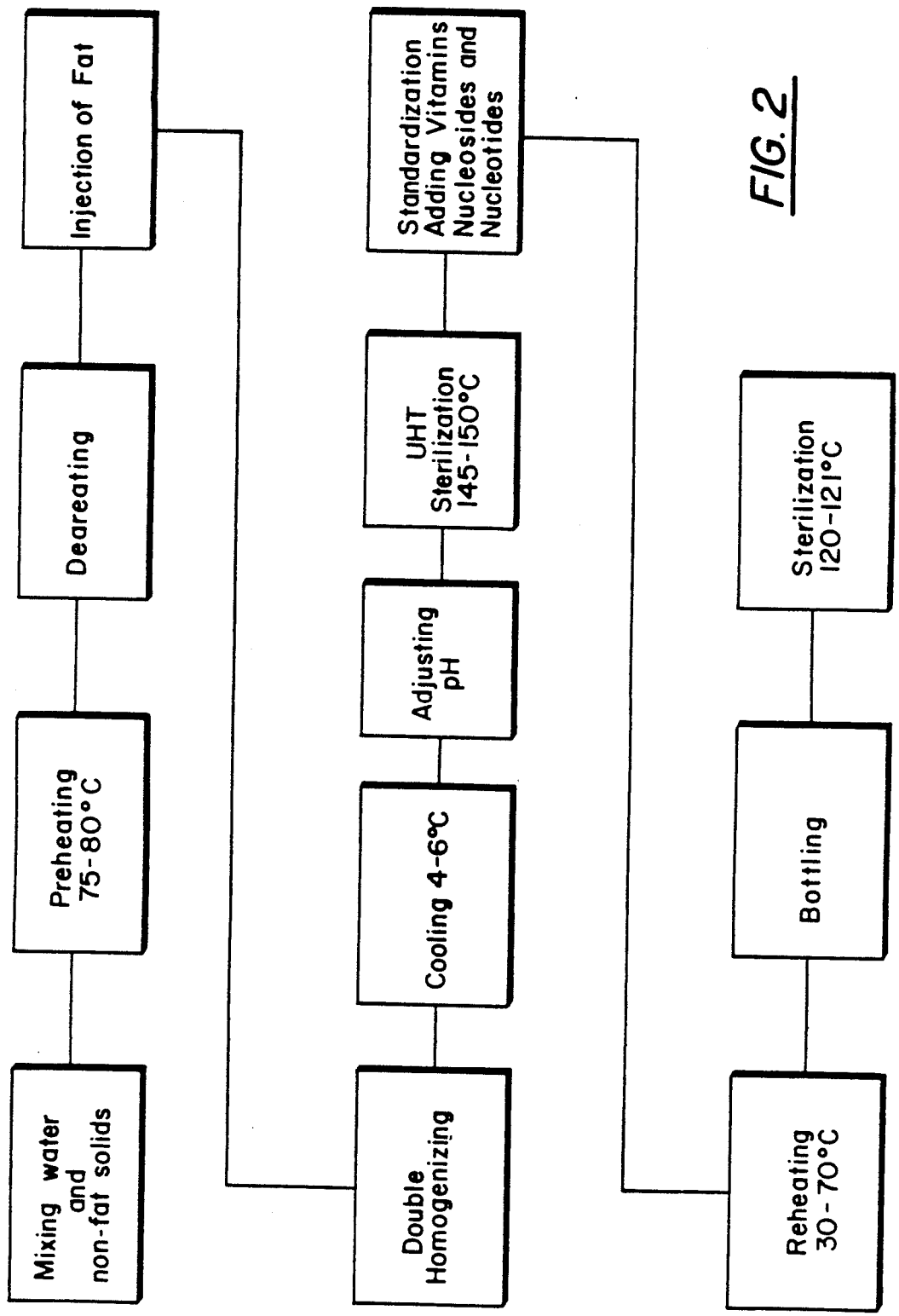

With reference to FIG. 2, there is depicted a process for the preparation and bottling of a liquid infant formula or a liquid nutritionally balanced diet formulation comprising a composition as set forth above, said process comprising the steps of:

(a) mixing water and non-fat solids of said composition in the absence of any vitamins, nucleosides and nucleotides;
(b) preheating the mixture to a temperature ranging from about 75° to about 80° C. and then deareating the heated mixture followed by adding any fats in the composition to the deareated mixture;
(c) homogenizing the mixture under pressure followed by cooling;
(d) adjust the pH of the mixture in the range of about 6.8 to about 7.1, followed by UHT sterilization;
(e) standardizing the UHT sterilized mixture by the addition of any vitamins, minerals, nucleosides, nucleotides and other components not added in step (a) and reheating the standardized mixture to a temperature ranging from about 30° to about 70° C. and bottling the heated mixture;
(d) sterilizing the bottled mixture a second time to obtain a final bottled product in liquid form.

Figure 3:
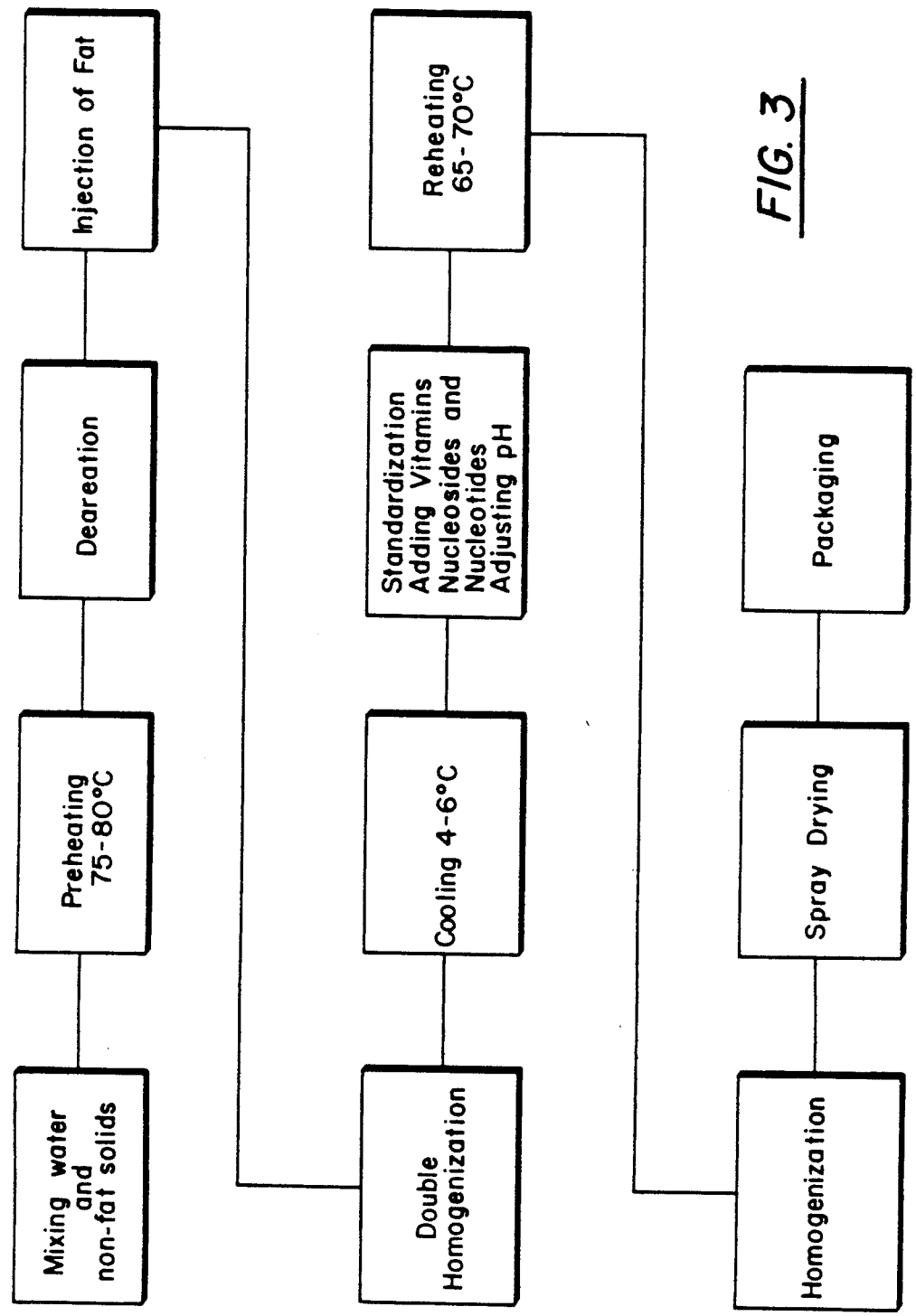

With reference to FIG. 3, there is depicted a process for the preparation in powder form of an infant formula or a nutritionally balanced diet formulation comprising a composition as set forth above said process comprising the steps of:

(a) mixing water and non-fat solids of said composition in the absence of any vitamins, nucleosides and nucleotides;
(b) preheating the mixture to a temperature ranging from about 75° to about 80° C. and then deareating the heated mixture followed by adding any fats in the composition to the deareated mixture;
(c) homogenizing the mixture under pressure followed by cooling;
(d) standardizing the mixture by addition of any vitamins, minerals, nucleosides, nucleotides and other components not added in step (a), and adjusting the pH in the range of about 6.8 to about 7.1;
(e) reheating the standardized mixture to between about 65° C. and 70° C.;
(f) homogenizing the reheated mixture and drying the homogenized mixture in a spray drier to obtain a final dry powder product; and
(g) packaging the dry powder product.

Figure 4:
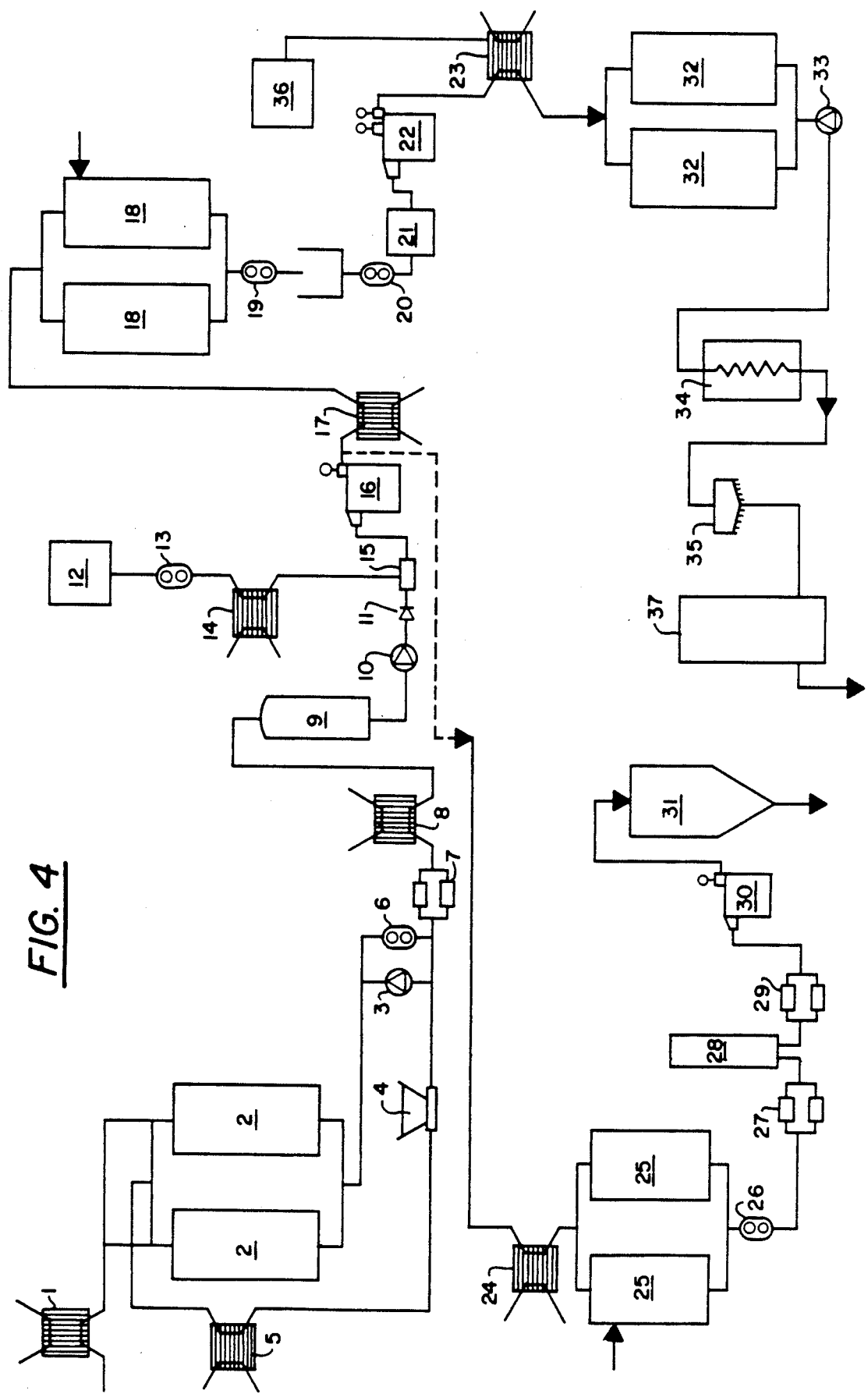
FIG. 4 is a schematic view of the plant manufacturing process for preparing products of the present invention.

Referring to FIG. 4, the process is described in more detail below:

Through the plate heat exchanger 1, deionized water is fed to storage tanks 2, at a temperature between 60°–70° C. Through the centrifugal pump 3 and triblender 4 non fat solids (proteins, carbohydrates and some minerals) are dissolved being maintained the temperature at 60°–65° C. by means of a plate heat exchanger 5.

The resulting mixture is fed through positive pump 6 to filters 7 and plate heat exchanger 8 to be heated to 75°–80° C. for 15–20 s to get the product pasteurized; being immediately deaerated in a vacuum deaerator 9, lowering the temperature to 70°–75° C. Afterwards, the deaerated product is fed through centrifugal pump 10 and mixed with fat through fat injector 15. The mixture of fats stored in tank 12 has been fed through positive pump 13 to plate heat exchanger 14 to be heated at 70°–75° C. before reaching fat inyector 15. A retention valve 11 prevents the product which contains the non fat solids and fat to go back to the deaerator.

Immediately after fats are mixed to the non fat solids mixture, the product is homogenized at 16 and a temperature of about 70°–75° C. and 200–300 Kg/cm$^2$ of total pressure, preferably in two stages (1st 150–200 Kg/cm$^2$, 2nd 50–100 Kg/cm$^2$).

For liquid products which are to be aseptically packaged, after homogenization 16, they are cooled to 4° to 6° C. in plate heat exchanger 17 and fed to isothermal standardizing tanks 18 where the pH is adjusted to from about 6.8 to about 7.1 depending on the product desired. Vitamins, minerals, nucleotides and/or nucleosides in the required amounts are fed to 18 and the resulting mixture is fed by pumps 19 and 20 to a UHT sterilizer 21 which is at 145°–150° C., homogenized in 22 (preferably in a double stage at 80° C. and 200–250 Kg/cm$^2$), then is cooled to 20° to 25° in heat exchanger and aseptically packaged in 36. The packing is preferably brick type of cardboard, paperboard, aluminium and polyethylene.

For liquid products which are to be bottled, the process is the same as above through the cooling treatment 17. Then the pH is adjusted in tanks 18 to above noted values. The mixture is fed by pumps 19 and 20 for UHT sterilization at 21 and homogenization at 22. The sterilized mixture is cooled 23 and fed directly to standardizing tanks 32 where vitamins, minerals nucleosides and/or nucleotides as required are added. From tanks 32, and by means of pump 33, the mixture is fed to reheater 34 where the temperature is raised to about 30° C. (for polyethylene bottles) to 70° C. (for glass bottles). The mixture is bottled in a filling machine 35 and subjected to sterilization 37 at a temperature of about 120°–121° C. for about 10 to 15 minutes to give a bottled product.

For powder products, the process is the same as first described above through homogenization 16. As shown by the dotted line, the product is fed to heat exchanger 24 and cooled to about 4° to about 6° C. and fed to isothermal standardizing tanks 25, where the pH is adjusted and the required vitamins, minerals, nucleosides and/or nucleotides are added. Then the standardized product is pumped 26 through filters 27 and fed to reheater 28 where the temperature is raised to about 65° to about 70° C., and then finally filtered 29 and homogenized 30 under a pressure of about 100°–200° Kg/cm$^2$. The homogenized product is fed to a drying tower 31, spray dried and collected for packaging.

EXAMPLES

The invention is illustrated with the following examples, which are not to be construed as limiting the scope of the invention.

EXAMPLE I

This example provides a product made to feed preterm and low-birth weight infants, enriched with nucleosides and/or nucleotides and according to the invention. Basically, the product is a mixture of cow's milk, demineralized serum protein, dextrinmaltose, fat mixture, mineral, vitamins and nucleosides and/or nucleotides mixtures.

The product has been adapted in the protein, fat carbohydrates, minerals and vitamins contents to the ESPGAN and AAP international recommendations as related to the feeding of low-birth weight infants (ESPGAN, Committee on Nutrition, Acta Paediatr. Scand., 1987 (in press); AAP, Committee on Nutrition, Pediatrics, 1985).

TABLE IV
EXAMPLE I
ADAPTED MILK FORMULA FOR PRETERM INFANTS

| Ingredients | For 100.g of powder | For 100 ml of liquid |
|---|---|---|
| Water | — | 85% |
| Maltodextrines | 28.91% | 4.33% |
| Vegtable oil mixture | 20.23% | 3.03% |
| Skim milk (0.05% M.G.) | 14.58% | 2.19% |
| Lactalbumin | 12.13% | 1.82% |
| Lactose | 11.92% | 1.79% |
| Butterfat | 6.45% | 0.97% |
| Minerals** | 3.26% | 0.49% |
| Calcium caseinate | 1.97% | 0.296% |
| Lecithin | 0.41% | 0.061% |
| Vitamins*** | 0.12% | 0.018% |
| Nucleosides and/or nucleotides* | 0.0078% | 0.0012% |
| Ascorbile palmitate | 0.006% | 0.0009% |
| DL-α Tocopherol | 0.001% | 0.0001% |
| *Nucleosides and/or nucleotides added | | |
| Uridine and/or uridine monophosphate | 3.42 mg | 515 μg |
| Guanosine and/or guanosine monophosphate | 1.49 mg | 225 μg |
| Adenosine and/or adenosine monophosphate | 1.32 mg | 200 μg |
| Cytidine and/or cytidine monophosphate | 1.12 mg | 170 μg |
| Inosine and/or inosine monophosphate | 0.45 mg | 70 μg |
| **Mineral salts added | | |
| Calcium lactate | 1.74 g | 0.26 g |
| Sodium phosphate dibasic | 0.65 g | 97 mg |
| Calcium phosphate | 0.36 g | 54 mg |
| Potassium chloride | 0.23 g | 34 mg |
| Potassium phosphate dibasic | 0.17 g | 26 mg |
| Ferrous lactate | 51.7 mg | 7.6 mg |
| Magnesic sulfate | 49 mg | 7.3 mg |
| Zinc sulfate | 7.3 mg | 1.1 mg |
| Cupric sulfate | 1.9 mg | 285 μg |
| Sodium fluoride | 1.5 mg | 225 μg |
| Potassium and chromiun sulfate | 510 μg | 76 μg |
| Sodium molybdate | 265 μg | 40 μg |
| Sodium selenite | 180 μg | 27 μg |
| Manganese sulfate | 83 μg | 12 μg |
| Potassium iodine | 64 μg | 10 μg |
| ***Vitamins added | | |
| Vitamin A | 1.600 UI | 240 UI |
| Vitamin D | 600 UI | 90 UI |
| Vitamin E | 5.5 mg | 825 μg |
| Vitamin K | 60 μg | 9 μg |
| Tiamin | 0.4 mg | 60 μg |
| Riboflavin | 0.45 mg | 67 μg |
| Piridoxin | 0.25 mg | 37 μg |
| Niacin | 6.7 mg | 1 mg |
| Calcium pantothenate | 5.5 mg | 825 μg |
| Vitamin B$_{12}$ | 1.1 μg | 0.16 μg |
| Biotin | 15 μg | 2.2 μg |
| Folic acid | 350 μg | 52 μg |
| Vitamin C | 100 mg | 15 mg |

EXAMPLE II

This example provides a milk formula made to feed at-term infants, during the first year of life, preferably for the 6 first months of lactation, supplemented with nucleosides and/or nucleotides in similar concentrations to those of human milk, according to the invention.

The product has been adapted in its composition and content of nutrients to the ESPGAN and AAP international recommendations for this kind of infants (ESPGAN. Committee on Nutrition, Acta Paediatr. Scand., supl. 262, 1977; AAP Committee on Nutrition, Pediatric Nutrition Handbook, 1979)

TABLE V
EXAMPLE II
ADAPTED INFANT MILK FORMULA

| Ingredients | For 100 g of powder | For 100 ml of liquid |
|---|---|---|
| Water | — | 87% |
| Lactose | 42.61% | 5.54% |
| Powdered milk (26% M.G.) | 25.47% | 3.31% |
| Vegtable oils | 13.37% | 1.74% |
| Demineralized whey (65% of proteins) | 9.28% | 1.21% |
| Butterfat | 7.77% | 1.01% |
| Minerals salts* | 1.11% | 0.14% |
| Lecithin | 0.31% | 0.04% |
| Vitamins** | 0.069% | 0.009% |
| Nucleosides and/or nucleotides*** | 0.0078% | 0.001% |
| DL-α Tocopherol | 0.003% | 0.0004% |
| Ascorbile palmitate | 0.001% | 0.0001% |
| *Mineral salts added | | |
| Tripotassium citrate | 0.35 g | 45 mg |
| Tricalcium citrate | 0.31 g | 40 mg |
| Dibasic potassium phosphate | 0.24 g | 31 mg |
| Calcium chloride | 0.16 g | 21 mg |
| Ferrous lactate | 39 mg | 5.1 mg |
| Zinc acetate | 8.5 mg | 1.1 mg |
| Cupric sulfate | 1.10 mg | 143 μg |
| Manganese sulfate | 155 μg | 20 μg |
| Potassium iodine | 65 μg | 8.4 μg |
| **Vitamins added | | |
| Vitamin C | 50 mg | 6.5 mg |
| Nicotinamide | 6.7 mg | 870 μg |
| Vitamin E | 5.5 mg | 715 μg |
| Calcium pantothenate | 5.5 mg | 715 μg |
| Vitamin A | 1.600 UI | 208 UI |
| Vitamin $B_2$ | 450 μg | 58 μg |
| Vitamin $B_1$ | 400 μg | 52 μg |
| Vitamin $B_6$ | 300 μg | 39 μg |
| Vitamin $K_1$ | 60 μg | 7.8 μg |
| Folic acid | 25 μg | 3.2 μg |
| Biotin | 15 μg | 1.9 μg |
| Vitamin $D_3$ | 300 UI | 39 UI |
| Vitamin $B_{12}$ | 1.1 μg | 0.14 μg |
| ***Nucleosides and/or nucleotides added | | |
| Uridine and/or uridine monophosphate | 3.42 mg | 445 μg |
| Guanosine and/or guanosine monophosphate | 1.49 mg | 195 μg |
| Adenosine and/or adenosine monophosphate | 1.32 mg | 170 μg |
| Cytidine and/or cytidine monophosphate | 1.12 mg | 145 μg |
| Inosine and/or inosine monophosphate | 0.45 mg | 58 μg |

EXAMPLE III

This example provides an infant milk formula made to feed healthy infants from 4–5 months to one year of life, supplemented with nucleosides and/or nucleotides, according to the invention. The product has been adapted in its composition content of nutrients to the ESPGAN recommendations for these infants ESPGAN Committee on Nutrition, Acta Paediatr. Scand. supl. 287, 1981).

TABLE VI
EXAMPLE III
INFANT ADAPTED FOLLOW-UP MILK FORMULA

| Ingredients | For 100 g of powder | For 100 ml of liquid |
|---|---|---|
| Water | — | 85% |
| Full milk | 46.61% | 6.99% |
| Maltodextrines | 23.18% | 3.48% |
| Lactose | 19.28% | 2.89% |
| Vegetable oils | 6.08% | 0.91% |
| Demineralized whey | 4.22% | 0.63% |
| Mineral salts* | 0.41% | 0.061% |
| Lecithin | 0.14% | 0.021% |
| Vitamins** | 0.069% | 0.01% |
| Nucleosides and/or nucleosides*** | 0.0078% | 0.0012% |
| DL-α Tocopherol | 0.003% | 0.0004% |
| Ascorbile palmitate | 0.001% | 0.0001% |
| *Mineral salts added | | |
| Monocalcium phosphate | 0.36 g | 54 mg |
| Ferrous lactate | 39 mg | 5.8 mg |
| Zinc acetate | 8.5 mg | 1.3 mg |
| Cupric sulfate | 1.1 mg | 165 μg |
| Manganese sulfate | 155 μg | 23 μg |
| Potassium iodine | 65 μg | 9.7 μg |
| **Vitamins added | | |
| As in Example II. | | |
| ***Nucleosides and/or nucleotides added | | |
| Uridine and/or uridine monophosphate | 3.42 mg | 515 μg |
| Guanosine and/or guanosine monophosphate | 1.49 mg | 225 μg |
| Adenosine and/or adenosine monophosphate | 1.32 mg | 200 μg |
| Cytidine and/or cytidine monophosphate | 1.12 mg | 170 μg |
| Inosine and/or inosine monophosphate | 0.45 mg | 70 μg |

EXAMPLE IV

This example provides a lactose free infant formula, containing protein from milk origin, supplemented with nucleosides and/or nucleotides to the same quantities as in human milk, according to this invention.

The product has been adapted in its composition and content of nutrients to the international recommendations mentioned before.

TABLE VII
LACTOSE FREE ADAPTED INFANT MILK FORMULA CONTAINING COW'S PROTEIN

| Ingredients | For 100 g of powder | For 100 ml of liquid |
|---|---|---|
| Water | — | 85% |
| Dextrinemaltose | 58.03% | 8.7% |
| Calcium caseinate (supplemented with L-cistine) | 16.7% | 2.51% |
| Butterfat | 11.96% | 1.79% |
| Vegetable oils | 10.35% | 1.55% |
| Mineral salts* | 2.18% | 0.33% |
| Lecithin | 0.69% | 0.103% |
| Vitamins** | 0.069% | 0.01% |
| Carnitine | 0.0089% | 0.0013% |
| Nucleosides and/or nucleotides*** | 0.0078% | 0.0012% |
| DL-αtocopherol | 0.003% | 0.0004% |
| Ascorbile palmitate | 0.001% | 0.0001% |
| *Mineral salts added | | |
| Dibasic potassium phosphate | 588 mg | 88 mg |
| Tripotassium citrate | 522 mg | 78 mg |
| Calcium lactate | 272 mg | 41 mg |
| Sodium chloride | 389 mg | 58 mg |
| Magnesium chloride | 260 mg | 39 mg |
| Calcium chloride | 90 mg | 13.5 mg |
| Ferrous lactate | 48 mg | 7.2 mg |
| Zinc acetate | 11.2 mg | 1.7 mg |
| Cupric sulfate | 1.15 mg | 0.17 mg |
| Manganese sulfate | 107 μg | 16 μg |
| Potassium iodine | 65 μg | 9.7 μg |
| **Vitamins added | | |
| As in Example II. | | |
| ***Nucleosides and/or nucleotides and other substances added | | |
| Uridine and/or uridine monophosphate | 3.42 mg | 515 μg |
| Guanosine and/or guanosine monophosphate | 1.49 mg | 225 μg |
| Adenosine and/or adenosine monophos- | 3.32 mg | 500 μg |

TABLE VII-continued
LACTOSE FREE ADAPTED INFANT MILK FORMULA CONTAINING COW'S PROTEIN

| | For 100 g of powder | For 100 ml of liquid |
|---|---|---|
| phate | | |
| Cytidine and/or cytidine monophosphate | 4.98 mg | 750 μg |
| Inosine and/or inosine monophosphate | 1.00 mg | 150 μg |
| L-cistine | 0.1 g | 15 μg |
| Carnitine | 8.9 mg | 1.3 mg |

EXAMPLE V

This example provides a lactose free adapted infant formula containing a protein isolate from vegetal origin, supplemented with nucleosides and/or nucleotides, according to this invention.

The product has been adapted, as in example IV, in its composition and content of nutrients to the suckling children and newborns.

TABLE VIII
LACTOSE-FREE ADAPTED INFANT FORMULA CONTAINING VEGETAL PROTEIN

| | For 100 g of powder | For 100 ml of liquid |
|---|---|---|
| Ingredients | | |
| Water | — | 85% |
| Dextrinemaltose | 57.20% | 8.58% |
| Soy protein isolate | 16.67% | 2.5% |
| Butterfat | 11.96% | 1.79% |
| Vegetable oils | 10.35% | 1.55% |
| Mineral salts* | 3.04% | 0.46% |
| Lecithin | 0.69% | 0.103% |
| Vitamins** | 0.069% | 0.01% |
| Carnitine | 0.0089% | 0.0013% |
| Nucleosides and/or nucleotides*** | 0.0078% | 0.0012% |
| DL-αtocopherol | 0.003% | 0.0004% |
| Ascorbile palmitate | 0.001% | 0.0001% |
| *Mineral salts added | | |
| Dibasic potassium phosphate | 450 mg | 67.5 mg |
| Tripotassium citrate | 628 mg | 94.2 mg |
| Calcium chloride | 370 mg | 55.5 mg |
| Calcium carbonate | 400 mg | 60 mg |
| Magnesium chloride | 260 mg | 39 mg |
| Calcium lactate | 873 mg | 131 mg |
| Ferrous lactate | 48 mg | 7.2 mg |
| Zinc acetate | 11.2 mg | 1.7 mg |
| Cupric sulfate | 1.18 mg | 0.18 mg |
| Magnesium sulfate | 107 μg | 25 μg |
| Potassium iodine | 65 μg | 9.7 μg |
| **Vitamins added | | |
| As in Example II. | | |
| ***Nucleosides and/or nucleotides and other substances added | | |
| Uridine and/or uridine monophosphate | 3.42 mg | 515 μg |
| Guanosine and/or guanosine monophosphate | 1.49 mg | 225 μg |
| Adenosine and/or adenosine monophosphate | 3.32 mg | 500 μg |
| Cytidine and/or cytidine monophosphate | 4.98 mg | 750 μg |
| Inosine monophosphate or inosine | 1.00 mg | 150 μg |
| Carnitine | 8.9 mg | 1.3 μg |

EXAMPLE VI

This example provides a lactose-free infant formula which contains a mixture of lactalbumin and casein hydrolizates with a low molecular weight, supplemented with nucleosides and/or nucleotides, as specified in the invention.

The composition and content of nutrients are adapted to the suckling children and newborns' requirements, as in examples IV and V.

TABLE IX
HYPOALERGENIC ADAPTED INFANT FORMULA

| | For 100 g of powder | For 100 ml of liquid |
|---|---|---|
| Ingredients | | |
| Water | — | 85% |
| Maltodextrines | 52.48% | 7.87% |
| Vegetable oil mixtures | 16.98% | 2.55% |
| Lactalbumin enzymatic hydrolyzate | 12.31% | 1.85% |
| Casein enzymatic hydrolyzate | 5.16% | 0.77% |
| Corn starch | 4.87% | 0.73% |
| Butterfat | 4.29% | 0.64% |
| Minerals** | 3.19% | 0.48% |
| Emulsifier | 0.60% | 0.09% |
| Vitamins*** | 0.069% | 0.01% |
| Lecithin | 0.0231% | 0.0035% |
| Carnitine | 0.0089% | 0.0013% |
| Nucleosides and/or nucleotides* | 0.0078% | 0.0012% |
| DL-αTocopherol | 0.0038% | 0.0006% |
| Ascorbile palmitate | 0.0015% | 0.0002% |
| *Nucleosides and/or nucleotides and other substances added | | |
| Uridine and/or uridine monophosphate | 3.42 mg | 515 μg |
| Guanosine and/or guanosine monophosphate | 1.49 mg | 225 μg |
| Adenosine and/or adenosine monophosphate | 3.32 mg | 500 μg |
| Cytidine and/or cytidine monophosphate | 4.98 mg | 750 μg |
| Inosine and/or inosine monophosphate | 1.00 mg | 150 μg |
| Carnitine | 8.9 mg | 1.3 mg |
| **Mineral salts added | | |
| Calcium phosphate | 0.86 g | 0.13 g |
| Tripotassium citrate | 0.85 g | 0.13 g |
| Calcium chloride | 0.49 g | 73 mg |
| Sodium phosphate dibasic | 0.38 g | 57 mg |
| Potassium chloride | 0.24 g | 36 mg |
| Magnesium sulfate | 0.20 g | 30 mg |
| Potassium phosphate dibasic | 0.12 g | 18 mg |
| Ferrous lactate | 39 mg | 5.8 mg |
| Zinc acetate | 10 mg | 1.5 mg |
| Cupric sulfate | 2.2 mg | 330 μg |
| Sodium fluoride | 310 μg | 46.5 μg |
| Manganese sulfate | 307 μg | 46 μg |
| Potassium chromium sulfate | 115 μg | 17 μg |
| Sodium molybdate | 83 μg | 12 μg |
| Potassium iodine | 65 μg | 9.7 μg |
| Sodium selenite | 37 μg | 5.5 μg |
| ***Vitamins added | | |
| As in Example II. | | |

The products in examples IV, V and VI contain carnitine in similar concentration to that found in human milk, to satisfy the newborns requirements of this compound.

The products in examples I to VI are presented as liquid products, ready to use, as liquid concentrate products, to be used with the addition of water and as powdered products.

EXAMPLE VII

Example VII provides a complete product and nutritionally balanced to be used in clinical nutrition orally or by feeding tubes, with an energy ratio of 146 Kcal/g nitrogen, enriched with nucleosides and/or nucleotides in agreement with the invention.

The composition and content of nutrients have been adapted to the specific nutritional requirements of ill adults suffering energy-protein malnutrition.

TABLE X
NORMOPROTEIN DIET FOR USE IN CLINICAL NUTRITION

| COMPOSITION | For 100 g of powder | For 100 ml of liquid |
|---|---|---|
| Water | — | 78.7% |
| Maltodextrines | 52.13% | 11.2% |
| Vegetable oils | 12.1% | 2.5% |
| Lactalbumin | 11.63% | 2.48% |
| Calcium caseinate | 10.05% | 2.14% |
| Butterfat | 8.84% | 1.88% |
| Minerals* | 3.79% | 0.79% |
| Nucleosides and/or nucleotides*** | 0.75% | 0.15% |
| Soy lecithin | 0.66% | — |
| Emulsifier | — | 0.136% |
| Stabilizer | — | 0.02% |
| Vitamins** | 0.026% | 0.005% |
| Ascorbile palmitate | 0.0232% | 0.0008% |
| DL-αTocopherol | 0.0008% | 0.0002% |
| *Mineral salts added | | |
| Sodium phosphate dibasic | 1.1 g | 270 mg |
| Potassium chloride | 0.99 g | 210 mg |
| Magnesium sulfate | 1.014 g | 203 mg |
| Calcium chloride | 0.31 g | 58 mg |
| Potassium phosphate dibasic | 0.28 g | 34 mg |
| Sodium chloride | 50 mg | 6 mg |
| Ferrous lactate | 21 mg | 4 mg |
| Zinc acetate | 14 mg | 3 mg |
| Manganese sulfate | 4 mg | 760 μg |
| Cupric sulfate | 3 mg | 640 μg |
| Sodium fluoride | 2.2 mg | 442 μg |
| Potassium chromium sulfate | 480 μg | 96 μg |
| Sodium molybdate | 315 μg | 63 μg |
| Sodium selenite | 166 μg | 33 μg |
| Potassium iodine | 49 μg | 10 μg |
| **Vitamins added | | |
| Vitamin C | 15 mg | 3 mg |
| Niacin | 4.75 mg | 0.95 mg |
| Vitamin E (mg. -TE) | 2.5 mg | 0.5 mg |
| Pantothenic acid | 1.75 mg | 0.35 mg |
| Vitamin $B_6$ | 550 μg | 110 μg |
| Vitamin $B_2$ | 425 μg | 85 μg |
| Vitamin $B_1$ | 375 μg | 75 μg |
| Vitamin A (mg Re) | 250 μg | 50 μg |
| Folate | 100 μg | 20 μg |
| Biotin | 50 μg | 10 μg |
| Vitamin $K_1$ | 35 μg | 7 μg |
| Vitamin D | 2.5 μg | 0.5 μg |
| Vitamin $B_{12}$ | 0.75 μg | 0.15 μg |
| ***Nucleosides and/or nucleotides added | | |
| Adenosine and/or adenosine monophosphate | 150 mg | 30 mg |
| Cytidine and/or cytidine monophosphate | 150 mg | 30 mg |
| Guanosine and/or guanosine monophosphate | 150 mg | 30 mg |
| Uridine and/or uridine monophosphate | 150 mg | 30 mg |
| Inosine and/or inosine monophosphate | 150 mg | 30 mg |

EXAMPLE VIII

This example provides a complete product and nutritionally balanced high protein content (91 Kcal/g nitrogen), enriched with nucleosides and/or nucleotides in agreement with the invention.

The composition and content of nutrients have been adapted to meet the specific nutritional requirements of ill adults in hypercatabolic state.

TABLE XI
HYPERPROTEIN DIET FOR USE IN CLINICAL NUTRITION

| COMPOSITION | For 100 g of powder | For 100 ml of liquid |
|---|---|---|
| Water | — | 77.28% |
| Maltodextrines | 50.6% | 11.49% |
| Lactalbumin | 15.96% | 3.64% |
| Calcium caseinate | 13.08% | 3.14% |
| Vegetable oils | 9.13% | 1.99% |
| Butterfat | 6.52% | 1.49% |
| Minerals* | 3.41% | 0.68% |
| Nucleosides and/or nucletides*** | 0.75% | 0.15% |
| Soy lecithin | 0.5% | — |
| Emulsifier | — | 0.11% |
| Stabilizer | — | 0.02% |
| Vitamins** | 0.026% | 0.005% |
| Ascorbile palmitate | 0.0232 | 0.0008% |
| DL-α-Tocopherol | 0.0008 | 0.0002% |
| *Mineral salts added | | |
| Potassium chloride | 1.01 g | 220 mg |
| Magnesium sulfate | 1.014 g | 203 mg |
| Sodium phosphate dibasic | 0.88 g | 180 mg |
| Potassium phosphate dibasic | 0.19 g | 30 mg |
| Sodium chloride | 0.16 g | 40 mg |
| Calcium chloride | 0.11 g | 5 mg |
| Ferrous lactate | 21 mg | 4 mg |
| Zinc acetate | 14 mg | 3 mg |
| Manganese sulfate | 4 mg | 760 μg |
| Cupric sulfate | 3 mg | 640 μg |
| Sodium fluoride | 2.2 mg | 442 μg |
| Potassium chromium sulfate | 480 μg | 96 μg |
| Sodium molybdate | 315 μg | 63 μg |
| Sodium selenite | 166 μg | 33 μg |
| Potassium iodine | 49 μg | 10 μg |
| **Vitamins added | | |
| As in Example VII | | |
| ***Nucleosides and/or nucleotides added | | |
| Adenosine and/or adenosine monophosphate | 150 mg | 30 mg |
| Cytidine and/or cytidine monophosphate | 150 mg | 30 mg |
| Guanosine and/or guanosine monophosphate | 150 mg | 30 mg |
| Uridine and/or uridine monophosphate | 150 mg | 30 mg |
| Inosine and/of inosine monophosphate | 150 mg | 30 mg |

EXAMPLE IX

This example provides a complete product and nutritionally balanced, with a high nitrogen content, using as source of this element a protein hydrolyzate with a low molecular weight to make easier its absorption, enriched with nucleosides and/or nucleotides according to the invention. The energy ratio this product is 100 Kcal/g nitrogen.

This composition and content of nutrients have been adapted to satisfy specific nutritional requirements of ill adults suffering diverse malabsorption-malnutrition syndromes.

TABLE XII
EXAMPLE IX
PEPTIDE-MCT DIET FOR USE IN CLINICAL NUTRITION

| COMPOSITION | For 100 g of powder | For 100 ml of liquid |
|---|---|---|
| Water | — | 77.83% |
| Maltodextrines | 51.62% | 11.43% |
| Casein hydrolyzate | 25.80% | 5.72% |
| Vegetable oils | 12.44% | 2.76% |
| Minerals* | 5.02% | 1.11% |
| Butterfat | 3.62% | 0.8% |
| Nucleosides and/or nucleotides*** | 0.75% | 0.17% |
| Soy lecithin | 0.50% | — |
| Emulsifier | — | 0.11% |

TABLE XII-continued

EXAMPLE IX
PEPTIDE-MCT DIET FOR USE IN CLINICAL NUTRITION

| COMPOSITION | For 100 g of powder | For 100 ml of liquid |
|---|---|---|
| L-Cistine | 0.20% | 0.04% |
| Stabilizer | — | 0.02% |
| Vitamins** | 0.026% | 0.0058% |
| Ascorbile palmitate | 0.0232% | 0.0051% |
| DL-α-Tocopherol | 0.0008% | 0.0002% |
| Sodium phosphate dibasic | 1.05 g | 233 mg |
| Magnesium sulfate | 1.014 g | 225 mg |
| Calcium chloride | 0.84 g | 186 mg |
| Tripotassium citrate | 0.83 g | 184 mg |
| Potassium phosphate dibasic | 0.80 g | 177 mg |
| Sodium chloride | 0.44 g | 97 mg |
| Ferrous lactate | 21 mg | 4.6 mg |
| Zinc acetate | 14 mg | 3.1 mg |
| Manganese sulfate | 4 mg | 888 μg |
| Cupric sulfate | 3 mg | 665 μg |
| Sodium fluoride | 2.2 mg | 488 μg |
| Potassium chromium sulfate | 480 μg | 106 μg |
| Sodium molybdate | 315 μg | 70 μg |
| Sodium selenite | 166 μg | 37 μg |
| Potassium iodine | 49 μg | 11 μg |
| Adenosine and/or adenosine monophosphate | 150 mg | 30 mg |
| Cytidine and/or cytidine monophosphate | 150 mg | 30 mg |
| Guanosine and/or guanosine monophosphate | 150 mg | 30 mg |
| Uridine and/or uridine monophosphate | 150 mg | 30 mg |
| Inosine and/or inosine monophosphate | 150 mg | 30 mg |
| L-Cistine | 200 mg | 40 mg |

*Mineral salts added
**Vitamins added
As in Example VII.
***Nucleosides and/or nucleotides and other substances added

EXAMPLE X

This example provides a complete product and nutritionally balanced with a low protein content, supplemented with branched chain amino acids and enriched with nucleosides and/or nucleotides.

The composition and content of nutrients have been adapted to satisfy the specific nutritional requirements of ill adults suffering severe hepatopathy.

TABLE XIII
EXAMPLE X
COMPLETE DIET FOR USE IN CLINICAL NUTRITION OF PATIENTS WITH LIVER DISEASE

| COMPOSITION | For 100 g of powder | For 100 ml of liquid |
|---|---|---|
| Water | — | 76.36% |
| Maltodextrines | 72.13% | 17.04% |
| Vegetable oils | 7.48% | 1.77% |
| Lactalbumin | 7.26% | 1.72% |
| Calcium caseinate | 6.27% | 1.48% |
| Minerals* | 2.94% | 0.69% |
| L-Leucine | 1.16% | 0.27% |
| L-Valine | 0.87% | 0.21% |
| L-Isoleucine | 0.87% | 0.21% |
| Nucleosides and/or nucleotides*** | 0.75% | 0.18% |
| Soy lecithin | 0.22% | — |
| Emulsifier | — | 0.05% |
| Stabilizer | — | 0.01% |
| Vitamins** | 0.026% | 0.006% |
| Ascorbile palmitate | 0.0197% | 0.005% |
| DL-α-Tocopherol | 0.0003% | 0.00007% |
| Magnesium sulfate | 1.014 g | 240 mg |
| Potassium phosphate dibasic | 0.67 g | 158 mg |
| Sodium phosphate dibasic | 0.60 g | 142 mg |
| Calcium chloride | 0.49 g | 116 mg |
| Sodium chloride | 0.12 mg | 28 mg |
| Ferrous lactate | 21 mg | 5 mg |
| Zinc acetate | 14 mg | 3.3 mg |
| Manganese sulfate | 4 mg | 946 μg |
| Cupric sulfate | 3 mg | 709 μg |
| Sodium fluoride | 2.2 mg | 520 μg |
| Potassium chromium sulfate | 480 μg | 113 μg |
| Sodium molybdate | 315 μg | 74 μg |
| Sodium selenite | 166 μg | 39 μg |
| Potassium iodine | 49 μg | 11.6 μg |
| Adenosine and/or adenosine monophosphate | 150 mg | 30 mg |
| Cytidine and/or cytidine monophosphate | 150 mg | 30 mg |
| Guanosine and/or guanosine monophosphate | 150 mg | 30 mg |
| Uridine and/or uridine monophosphate | 150 mg | 30 mg |
| Inosine and/or inosine monophosphate | 150 mg | 30 mg |
| L-Leucine | 1.16 g | 274 mg |
| L-Valine | 870 mg | 206 mg |
| L-Isoleucine | 870 mg | 206 mg |

*Mineral salts added
**Vitamins added
As in Example VII.
***Nucleosides and/or nucleotides and other substances added

EXAMPLE XI

This example provides a product considered as a nutritional supplement for the nutritional repletion of patients with chronic hepatopathy, constituted by a mixture of proteins from milk origin, supplemented with branched chain amino acids, carbohydrates, vitamins and minerals and enriched with nucleosides and/or nucleotides.

TABLE XIV
EXAMPLE XI
HYPERPROTENC DIET SUPPLEMENTED WITH BRANCHED CHAIN AMINO ACIDS FOR USE IN CLINICAL NUTRITION OF PATIENTS WITH LIVER DISEASE

| COMPOSITION | For 100 g of powder | For 100 ml of liquid |
|---|---|---|
| Water | — | 80% |
| Maltodextrines | 36.72% | 7.32% |
| Lactalbumin | 26.26% | 5.25% |
| Sodium caseinate | 21.95% | 4.39% |
| L-Leucine | 4.04% | 0.81% |
| Minerals* | 3.2% | 0.64% |
| L-Valine | 3.03% | 0.61% |
| L-Isoleucine | 3.03% | 0.61% |
| Nucleosides and/or nucleotides*** | 0.75% | 0.15% |
| Vitamins** | 0.026% | 0.005% |
| Magnesium sulfate | 1.014 g | 203 mg |
| Potassium chloride | 0.89 g | 178 mg |
| Calcium chloride | 0.38 g | 76 mg |
| Sodium phosphate dibasic | 0.36 g | 72 mg |
| Tripotassium citrate | 0.34 g | 68 mg |
| Potassium phosphate dibasic | 0.17 g | 34 mg |
| Ferrous lactate | 21 mg | 4.2 mg |
| Zinc acetate | 14 mg | 2.8 mg |
| Manganese sulfate | 4 mg | 800 μg |
| Cupric sulfate | 3 mg | 600 μg |
| Sodium fluoride | 2.2 mg | 440 μg |
| Potassium chromium sulfate | 480 μg | 96 μg |
| Sodium molybdate | 315 μg | 63 μg |
| Sodium selenite | 166 μg | 33 μg |
| Potassium iodine | 49 μg | 9.8 μg |
| Adenosine and/or adenosine monophosphate | 150 mg | 30 mg |

TABLE XIV-continued
EXAMPLE XI
HYPERPROTENC DIET SUPPLEMENTED WITH BRANCHED CHAIN AMINO ACIDS FOR USE IN CLINICAL NUTRITION OF PATIENTS WITH LIVER DISEASE

| COMPOSITION | For 100 g of powder | For 100 ml of liquid |
| --- | --- | --- |
| Cytidine and/or cytidine monophosphate | 150 mg | 30 mg |
| Guanosine and/or guanosine monophosphate | 150 mg | 30 mg |
| Uridine and/or uridine monophosphate | 150 mg | 30 mg |
| Inosine and/or inosine monophosphate | 150 mg | 30 mg |
| L-Leucine | 4.04 g | 810 mg |
| L-Valine | 3.03 g | 610 mg |
| L-Isoleucine | 3.03 g | 610 mg |

*Mineral salts added
**Vitamins added
As in Example VII.
***Nucleosides and/or nucleotides and other substances added The invention having been thus described, it will be appreciated by those in the art that variations can occur within the scope of the claims which follow.

We claim:

1. A method for the stimulation or repair and regeneration of intestinal gut cells in infants which comprises administering to an infant in need of such stimulation an amount effective for said stimulation of an infant formula free of cow's milk, said infant formula comprising a therapeutically effective amount of carbohydrates, a source of amino acids, vegetable oils, minerals, vitamins, and at least one member selected from the group consisting of uridine, uridine phosphate and mixtures thereof; guanosine, guanosine phosphate and mixtures thereof; adenosine, adenosine phosphate and mixtures thereof; cytidine, cytidine phosphate and mixtures thereof and inosine, inosine phosphate and mixtures thereof.

2. The method according to claim 1 wherein said infant formula comprises per dl:

| | |
| --- | --- |
| uridine | 0.2-60 mg; |
| guanosine | 0.2-60 mg; |
| adenosine | 0.2-60 mg; |
| cytidine | 0.2-60 mg; and |
| inosine | 0.2-60 mg. |

3. The method according to claim 2 wherein said formula comprises:

| | |
| --- | --- |
| uridine | 10-50 mg; |
| guanosine | 10-50 mg; |
| adenosine | 10-50 mg; |
| cytidine | 10-50 mg; and |
| inosine | 10-50 mg. |

4. A method for the stimulation or repair and regeneration of intestinal gut cells in infants which comprises administering to an infant in need of such stimulation an amount effective for said stimulation of an infant formula in liquid form which comprises a therapeutically effective amount of a source of amino nitrogen, carbohydrates, edible fats, minerals, vitamins and a nucleoside and/or nucleotide composition comprising at least one member selected from the group consisting of:
(a) uridine, uridine phosphate and a mixture thereof;
(b) guanosine, guanosine phosphate and a mixture thereof;
(c) adenosine, adenosine phosphate and a mixture thereof;
(d) cytidine, cytidine phosphate and a mixture thereof; and
(e) inosine, inosine phosphate and a mixture thereof; wherein the total amount combined nucleoside and nucleotide content is in the range of between about 10 to 250 mg for each 100 g of said formula.

5. A method for enhancing the immune response of T-cells and for providing specific fatty acid phospholipids profiles in red blood cell membranes of infants, which comprises administering to an infant in need of enhanced immune response of T-cells an effective amount for enhancing said response of an infant formula free of cow's milk, said infant formula comprising a therapeutically effective amount of carbohydrates, a source of amino acids, vegetable oils, minerals, vitamins and at least one member selected from the group consisting of uridine, uridine phosphate and mixtures thereof; guanosine, guanosine phosphate and mixtures thereof; adenosine, adenosine phosphate and mixtures thereof; cytidine, cytidine phosphate and mixtures thereof and inosine, inosine phosphate and mixtures thereof.

6. The method according to claim 5, wherein said infant formula comprises per dl:

| | |
| --- | --- |
| uridine | 0.2-60 mg; |
| guanosine | 0.2-60 mg; |
| adenosine | 0.2-60 mg; |
| cytidine | 0.2-60 mg; and |
| inosine | 0.2-60 mg. |

7. The method according to claim 6 wherein said formula comprises:

| | |
| --- | --- |
| uridine | 10-50 mg; |
| guanosine | 10-50 mg; |
| adenosine | 10-50 mg; |
| cytidine | 10-50 mg; and |
| inosine | 10-50 mg. |

8. A method for enhancing the immune response of T-cells and for providing specific fatty acid phospholipids profiles in red blood cell membranes of infants, which comprises administering to an infant in need of enhanced immune response of T-cells an effective amount for enhancing said responses an infant formula in liquid form which comprises a therapeutically effective amount of a source of amino nitrogen, carbohydrates, edible fats, minerals, vitamins and a nucleoside and/or nucleotide composition comprising at least one member selected from the group consisting of:
(a) uridine, uridine phosphate and a mixture thereof;
(b) guanosine, guanosine phosphate and a mixture thereof;
(c) adenosine, adenosine phosphate and a mixture thereof;
(d) cytidine, cytidine phosphate and a mixture thereof; and
(e) inosine, inosine phosphate and mixture thereof; wherein the total combined nucleoside and nucleotide content is in the range of between about 10 to 250 mg for each 100 g of said formula.

9. A method for the stimulation or repair and regeneration of intestinal gut cells in humans which comprises administering in need of such stimulation an amount effective for said stimulation of a formula free of cow's milk, said formula comprising a therapeutically effective amount of carbohydrates, a source of amino acids, vegetable oils, minerals, vitamins, and at least one member selected from the group consisting of uridine phosphate and mixtures thereof; guanosine, guanosine phosphate and mixtures thereof; adenosine, adenosine phosphate and mixtures thereof; cytidine, cytidine phosphate and mixtures thereof and inosine, inosine phosphate and mixtures thereof.

10. The method according to claim 9 wherein said formula comprises per dl:

| | |
|---|---|
| uridine | 0.2–60 mg; |
| guanosine | 0.2–60 mg; |
| adenosine | 0.2–60 mg; |
| cytidine | 0.2–60 mg; and |
| inosine | 0.2–60 mg. |

11. The method according to claim 10 wherein said formula comprises:

| | |
|---|---|
| uridine | 10–50 mg; |
| guanosine | 10–50 mg; |
| adenosine | 10–50 mg; |
| cytidine | 10–50 mg; and |
| inosine | 10–50 mg. |

12. A method for the stimulation or repair and regeneration of intestinal gut cells in humans which comprises administering to a human in need of such stimulation an amount effective for said stimulation of a formula in liquid form which comprises a therapeutically effective amount of a source of amino nitrogen, carbohydrates, edible fats, minerals, vitamins and a nucleoside and/or nucleotide composition comprising at least one member selected from the group consisting of:
 (a) uridine, uridine phosphate and a mixture thereof;
 (b) guanosine, guanosine phosphate and a mixture thereof;
 (c) adenosine, adenosine phosphate and a mixture thereof;
 (d) cytidine, cytidine phosphate and a mixture thereof; and
 (e) inosine, inosine phosphate and a mixture thereof;
 wherein the total combined nucleoside and nucleotide content is in the range of between about 10 to 250 mg for each 100 g of said formula.

13. A method for enhancing the immune response of T-cells and for providing specific fatty acid phospholipids profiles in red blood cell membranes of humans, which comprises administering to a human in need of enhanced immune response of T-cells an effective amount for enhancing said response of a formula free of cow's milk, said formula comprising a therapeutically effective amount of carbohydrates, a source of amino acids, vegetable oils, minerals, vitamins and at least one member selected from the group consisting of uridine, uridine phosphate and mixtures thereof; guanosine, guanosine phosphate and mixtures thereof; adenosine, adenosine phosphate and mixtures thereof; cytidine, cytidine phosphate and mixtures thereof and inosine, inosine phosphate and mixtures thereof.

14. The method according to claim 13 wherein said formula comprises per dl:

| | |
|---|---|
| uridine | 0.2–60 mg; |
| guanosine | 0.2–60 mg; |
| adenosine | 0.2–60 mg; |
| cytidine | 0.2–60 mg; and |
| inosine | 0.2–60 mg. |

15. The method according to claim 14 wherein said formula comprises:

| | |
|---|---|
| uridine | 10–50 mg; |
| guanosine | 10–50 mg; |
| adenosine | 10–50 mg; |
| cytidine | 10–50 mg; and |
| inosine | 10–50 mg. |

16. A method for enhancing the immune response of T-cells and for providing specific fatty acid phospholipids profiles in red blood cell membranes of humans, which comprises administering to a human in need of enhanced immune response of T-cells an effective amount for enhancing said response of a formula in liquid form which comprises a therapeutically effective amount of a source of amino nitrogen, carbohydrates, edible fats, minerals, vitamins and a nucleoside and/or nucleotide composition comprising at least one member selected from the group consisting of:
 (a) uridine, uridine phosphate and a mixture thereof;
 (b) guanosine, guanosine phosphate and a mixture thereof;
 (c) adenosine, adenosine phosphate and a mixture thereof;
 (d) cytidine, cytidine phosphate and a mixture thereof; and
 (e) inosine, inosine phosphate and a mixture thereof;
 wherein the total combined nucleoside and nucleotide content is in the range of between about 10 to 250 mg for each 100 g of said formula.

* * * * *

UNITED STATES PATENT AND TRADEMARK OFFICE
CERTIFICATE OF CORRECTION

PATENT NO. : 4,994,442

DATED : February 19, 1991

INVENTOR(S) : GIL et al.

It is certified that error appears in the above-identified patent and that said Letters Patent is hereby corrected as shown below:

Claim 4, column 24, line 6, delete "amount".

Claim 8, column 24, line 49, insert --of-- in front of "an infant".

Claim 9, column 24, line 68, insert --to a human-- after "administering".

Claim 9, column 25, line 5, insert --uridine,-- in front of "uridine phos-".

Signed and Sealed this

Twenty-eight Day of February, 1995

Attest:

BRUCE LEHMAN

Attesting Officer

Commissioner of Patents and Trademarks